(12) United States Patent
Sadakuni et al.

(10) Patent No.: US 11,383,543 B2
(45) Date of Patent: Jul. 12, 2022

(54) METHOD FOR PRODUCING PRINTED MATTER AND PRINTING MACHINE

(71) Applicant: TORAY INDUSTRIES, INC., Tokyo (JP)

(72) Inventors: Hironobu Sadakuni, Otsu (JP); Masatoshi Ohkura, Otsu (JP); Takejiro Inoue, Otsu (JP)

(73) Assignee: TORAY INDUSTRIES, INC., Tokyo (JP)

( * ) Notice: Subject to any disclaimer, the term of this patent is extended or adjusted under 35 U.S.C. 154(b) by 291 days.

(21) Appl. No.: 16/490,409

(22) PCT Filed: Feb. 28, 2018

(86) PCT No.: PCT/JP2018/007606
§ 371 (c)(1),
(2) Date: Aug. 30, 2019

(87) PCT Pub. No.: WO2018/163941
PCT Pub. Date: Sep. 13, 2018

(65) Prior Publication Data
US 2020/0009858 A1 Jan. 9, 2020

(30) Foreign Application Priority Data

Mar. 7, 2017 (JP) .............................. JP2017-042421
Dec. 22, 2017 (JP) .............................. JP2017-245835

(51) Int. Cl.
*B41M 5/50* (2006.01)
*B41M 1/06* (2006.01)
(Continued)

(52) U.S. Cl.
CPC ............... *B41M 5/50* (2013.01); *B05D 3/067* (2013.01); *B05D 3/068* (2013.01); *B41F 23/00* (2013.01);
(Continued)

(58) Field of Classification Search
None
See application file for complete search history.

(56) References Cited

U.S. PATENT DOCUMENTS

2010/0021636 A1 1/2010 Jacke et al.
2010/0239868 A1† 9/2010 Takada
(Continued)

FOREIGN PATENT DOCUMENTS

EP 1 902 849 A1 3/2008
EP 2517890 A1 10/2012
(Continued)

OTHER PUBLICATIONS

International Search Report, issued in PCT/JP2018/007606, PCT/ISA/210, dated Apr. 10, 2018.
(Continued)

*Primary Examiner* — Joshua D Zimmerman
(74) *Attorney, Agent, or Firm* — Birch, Stewart, Kolasch & Birch, LLP

(57) ABSTRACT

Provided are a method for producing a printed matter and a printing machine which suppress the decrease of transferability and improve adhesiveness between ink and a film substrate when ink is printed on the film substrate. The method for producing a printed matter of the present invention is a method for producing a printed matter by printing ink on a film, which uses a film having a nitrogen element concentration of 0.5 to 10.0 atom % in the film surface, and includes irradiating with an active energy ray after printing.

9 Claims, 1 Drawing Sheet

(51) Int. Cl.
*B41M 1/30* (2006.01)
*B41M 5/36* (2006.01)
*B41M 5/00* (2006.01)
*B41M 7/00* (2006.01)
*B41F 23/00* (2006.01)
*C09D 11/101* (2014.01)
*B05D 3/06* (2006.01)
*B29K 23/00* (2006.01)
*C08J 7/12* (2006.01)

(52) U.S. Cl.
CPC ........ *C09D 11/101* (2013.01); *B29K 2023/12* (2013.01); *B41M 1/06* (2013.01); *B41M 1/30* (2013.01); *B41M 1/305* (2013.01); *B41M 5/0011* (2013.01); *B41M 5/0064* (2013.01); *B41M 5/36* (2013.01); *B41M 7/0081* (2013.01); *C08J 7/123* (2013.01)

(56) References Cited

U.S. PATENT DOCUMENTS

2012/0205387 A1\* 8/2012 Manabe ................. B32B 27/32
　　　　　　　　　　　　　　　　　　　　　220/626
2013/0177721 A1\* 7/2013 Kadowaki ............... B32B 27/32
　　　　　　　　　　　　　　　　　　　　　428/35.2
2017/0015851 A1\* 1/2017 Sloan ................... C09D 11/104

FOREIGN PATENT DOCUMENTS

| EP | 3 002 321 A1 | | 4/2016 |
|---|---|---|---|
| JP | 63-145076 A | | 6/1988 |
| JP | H09131840 A | † | 5/1997 |
| JP | 10287787 A | \* | 10/1998 |
| JP | 2003-246023 A | | 9/2003 |
| JP | 2003246023 A | \* | 9/2003 |
| JP | 2003246023 A | † | 9/2003 |
| JP | 2008-143993 A | | 6/2008 |
| JP | 2011-131416 A | | 7/2011 |
| JP | 2015-168730 A | | 9/2015 |
| JP | 2016-69654 A | | 5/2016 |
| KR | 10-2004-0070285 A | | 8/2004 |

OTHER PUBLICATIONS

Written Opinion of the International Searching Authority, issued in PCT/JP2018/007606, PCT/ISA/237, dated Apr. 10, 2018.

\* cited by examiner
† cited by third party

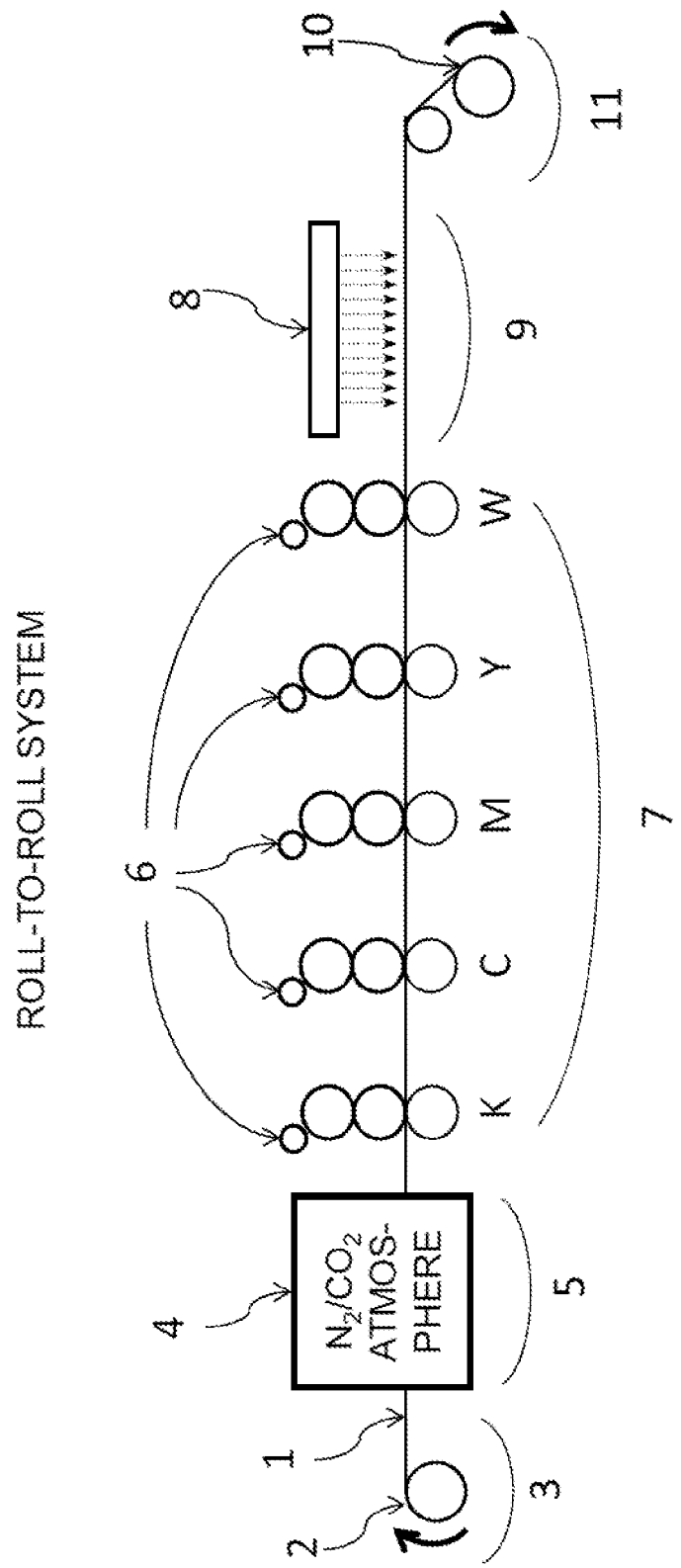

METHOD FOR PRODUCING PRINTED MATTER AND PRINTING MACHINE

TECHNICAL FIELD

The present invention relates to a method for producing a printed matter and a printing machine.

BACKGROUND ART

In recent years, the use of active energy ray-curable printing ink which can be instantaneously cured by irradiation with an active energy ray such as UV light is increasingly used in many fields owing to its advantages in equipment, safety, environment, and high productivity. Additionally, large amounts of petroleum solvents are used as cleaning solutions for ink used in printing processes, so that Patent Literature 1 discloses active energy ray-curable ink for offset printing which can be cleaned with a cleaning solution composed mainly of water containing no volatile solvent.

Since active energy ray-curable printing ink is cured at normal temperature in a short time, it is considered as an optimum material for forming a film on a plastic substrate having poor heat resistance. However, printing of active energy ray-curable printing ink on a film can cause deficiency of adhesiveness between the ink and film. Therefore, active energy ray-curable printing ink having marked adhesiveness to film is under development (Patent Literature 2).

CITATION LIST

Patent Literature

Patent Literature 1: JP 2008-143993 A (Claims)
Patent Literature 2: JP 2015-168730 A (Background art)

SUMMARY OF INVENTION

Technical Problem

However, it was found that adhesiveness between ink and film is insufficient even when printing on a film is performed using the active energy ray-curable printing ink having improved adhesiveness. It was also found that the use of a film with a low surface tension decreases ink transferability from a printing roller to a film, because the ink cannot thoroughly adhere to the film.

Therefore, the object of the invention is to provide a method for producing a printed matter and a printing machine which suppress the decrease of transferability and improves adhesiveness between ink and a film when active energy ray-curable printing ink, which used to have insufficient adhesiveness, is printed on the film.

Solution to Problem

The method for producing a printed matter of the present invention is a method for producing a printed matter by printing ink on a film, which uses a film having a nitrogen element concentration of 0.5 to 10.0 atom % in the film surface, and includes radiating an active energy ray after printing.

Advantageous Effects of Invention

According to the method for producing a printed matter of the present invention, ink transferability is good in printing of ink on a film, and adhesiveness between ink and a film is improved in the production of a printed matter by irradiating with an active energy ray.

BRIEF DESCRIPTION OF DRAWINGS

FIG. 1 is a schematic diagram schematically depicting an embodiment of the printing machine of the present invention.

DESCRIPTION OF EMBODIMENTS

The present invention is specifically described below.
In the present invention, a film is composed of a molded article made by molding a synthetic resin into a thin film, and generally refers to those in the form of a single layer and multiple layers.

The method for producing a printed matter of the present invention inevitably includes the following steps. Firstly, ink is applied to a specific film, thereby obtaining a printed matter having an ink film. The ink applied on a film (printed matter) is irradiated with an active energy ray.

The present invention uses a film having a nitrogen element concentration of 0.5 to 10.0 atom % in the film surface. The means for making the nitrogen element concentration in the film surface within the above-described range is described below. Irrespective of the method for producing a film, the present invention uses the film having a nitrogen element concentration of 0.5 to 10.0 atom % in the film surface.

The first means is to include a nitrogen compound containing at least one of melamine compounds and urethane compounds in a surface layer of the film. For example, the layer may be laminated by coating.

Examples of the melamine compounds include melamine, melamine resins, methylolated melamine derivatives obtained by condensation of melamine and formaldehyde, compounds obtained by reacting methylolated melamine with a lower alcohol, followed by partial or complete etherification, and mixtures of them. Additionally, the melamine resin may be a condensate prepared from a melamine monomer or a dimer or higher multimer, or a mixture of them. Examples of the lower alcohol used for etherification include, but not limited to, methyl alcohol, ethyl alcohol, isopropyl alcohol, n-butanol, and isobutanol. The melamine compound is preferably used in the form of a mixture with a polyester resin or an acrylic resin.

Examples of the urethane compound include urethane resins, urethane-modified copolymerized polyester resins, and urethane-acryl copolymer resins.

In the present invention, the layer including a nitrogen compound may be formed by coating the film surface, thereby making the nitrogen element concentration in the film surface fall within the above-described range. The film is preferably a polyamide film or a polyester film which is easily coated.

The method for coating the film may use a known coating system such as bar coating, reverse coating, gravure coating, die coating, or blade coating.

The film surface herein means the region which is detectable using X-ray photoelectron spectroscopy. In the X-ray photoelectron spectroscopy, the sample surface is irradiated with a soft X ray in an ultrahigh vacuum, and the photoelectrons released from the surface are detected with an analyzer.

Through the X-ray photoelectron spectroscopy, the element information, or the elemental composition of the surface is obtained from the binding energy value of bound electrons in the substance, and the information about the valence and bonding state is obtained from the energy shift of each peak. Furthermore, the element concentration can be determined using the peak area ratio. The determination of the nitrogen element concentration in the present invention is measured by the above-described means.

The second means for making the nitrogen element concentration in the film surface fall within the range of 0.5 to 10.0 atom % is to mix an amine ester compound in a film, and subject the film surface to corona discharge treatment in an air atmosphere.

Examples of the amine ester compound include, but not limited to, stearyl diethanolamine monostearate, oleyl diethanolamine monooleate, oleyl diethanolamine monostearate, oleyl diethanolamine monolaurate, oleyl diethanolamine monocaprylate, stearyl diethanolamine monoercate, stearyl diethanolamine monooleate, and lauryl diethanolamine monooleate.

The above-described amine ester compound is kneaded in a film, and treated by corona discharge in an air atmosphere, whereby the amine ester compound partially is deposited on the film surface, and the nitrogen element concentration in the elemental composition in the film surface can be made fall within the above-described range. The type of the plastic forming the film is not limited because marked effect is exerted on a wide range of plastic films from nonpolar polyolefin to strongly polar polyamide, and examples of the plastic include polyethylene, polypropylene, polyamide, and polyester. In particular, polyethylene and polypropylene films are difficult to be coated because they are nonpolar, and thus are suitable to kneading of the amine ester compound in these films, followed by corona discharge treatment in an air atmosphere.

The loading of the amine ester compound to the film is preferably from 0.25 to 2.0% by mass, and even more preferably from 0.5 to 1.5% by mass. When the loading is 0.25% by mass or more, the amount of the amine ester compound deposited by corona discharge treatment is sufficient, and this improves adhesiveness between film and ink. Additionally, when the loading is 2.0% by mass or less, whitening by time-dependent change scarcely occurs, so that film transparency and ink wettability are maintained, whereby good ink transferability is kept.

The third means for making the nitrogen element concentration in the film surface fall within the range of 0.5 to 10.0 atom % is to treat the film by corona discharge in the same manner as described above, but the corona discharge treatment herein is carried out not in an ordinary air atmosphere, but in a mixed gas atmosphere having a mixing ratio ($N_2/CO_2$) of nitrogen to carbon dioxide of 99.5/0.5 to 50/50 in terms of the volume ratio, and having an oxygen concentration of 0.1% by volume or less.

The mixing ratio of nitrogen to carbon dioxide ($N_2/CO_2$) is preferably within the range of 99.5/0.5 to 50/50 in terms of the volume ratio, and more preferably from 99.2/0.8 to 80/20 for improving ink transferability and adhesiveness. The volume fraction of carbon dioxide to the total of nitrogen and carbon dioxide is preferably 0.5% or more for keeping good surface tension of film, and improving wettability of ink and film, thereby achieving good ink transferability. Additionally, the volume fraction of carbon dioxide to the total of nitrogen and carbon dioxide is preferably 50% or less for improving adhesiveness between film and ink.

Furthermore, in the third embodiment of the present invention, the oxygen concentration in the treating atmosphere is preferably 0.1% by volume or less with reference to the whole mixed gas, and more preferably 0.05% by volume or less for keeping the treatment effect. When the oxygen concentration is 0.1% by volume or less, abrupt deterioration of the film surface caused by quick and predominant reaction of oxygen radicals generated during corona discharge treatment on the film surface, whereby adhesiveness between the ink and film is improved. A gas other than oxygen which has low reactivity with the film surface, such as argon or carbon monoxide may be added in a small amount.

The corona discharge treatment for the film used in the present invention exhibits marked effect on a wide range of plastic films from nonpolar polyolefin to strongly polar polyamide, so that the type of the plastic to be treated is not limited, and examples of the film include polyethylene, polypropylene, polyamide, and polyester films.

In particular, polyethylene and polypropylene films are difficult to be coated because they are nonpolar, so that they are preferably subjected to the corona discharge treatment.

The use of the above-described means allows the use of a film having a nitrogen element concentration of 0.5 to 10.0 atom % in the film surface, improves adhesiveness between the ink and film, and suppresses the decrease of ink transferability from the printing roller to the film. The reason for this is likely that the functional group derived from a compound containing nitrogen atoms such as an amino group on the film surface binds with the resin having an acidic group through, for example, hydrogen bonds. If the nitrogen element concentration in the film surface is below 0.5 atom %, bonding with ink becomes insufficient, so that adhesiveness decreases. Additionally, if the nitrogen element concentration in the film surface exceeds 10.0 atom %, the film tends to be yellowed in the production process such as irradiation with an active energy ray, or by exposure to UV light for a long period of time.

In the present invention, the elemental composition, or the nitrogen element concentration in the film surface is the average elemental composition, or the average nitrogen element concentration in the film surface. The nitrogen element concentration can be appropriately determined by a common composition analysis method such as X-ray photoelectron spectroscopy (XPS) or Rutherford backscattering spectrometry (RBS). Preferably, the analysis method is X-ray photoelectron spectroscopy, the excitation X-ray is monochromatic Al $K\alpha_{1,2}$ ray, X-ray diameter is 200 μm, and the photoelectron escape angle, or the inclination of the detector to the film surface is 45°.

The film used in the present invention more preferably has a thickness of 30 μm or less, whereby its use for soft packaging is enabled.

The corona discharge treatment in the present invention means the treatment method wherein a pair of electrodes are placed in a gas atmosphere having a pressure of about 100 mmHg to 3 atm, and a high voltage is applied to the space between the electrodes to generate corona, and the object to be treated is brought into contact with the corona. The size of the electric energy to be applied to the space between the electrodes depends on the material and use of the object to be treated, but is commonly preferably in the range of 500 to 30000 J per 1 $m^2$ of the surface area of the object to be treated. If the energy to be applied is less than 500 J, effect of the treatment will not be expressed, and if higher than 30000 J, deterioration of the modified layer proceeds, and the decrease adhesiveness can occur.

The ink used in the present invention is cured by an active energy ray. The irradiation with an active energy ray instantaneously cures the ink on a printed matter. Instantaneous curing with an active energy ray tends to cause internal stress by curing shrinkage, and this can cause the decrease of the adhesiveness to a film, but the use of the method for producing a printed matter of the present invention increases adhesiveness between the ink and film.

The active energy ray may any one as long as it has excitation energy necessary for curing reaction, and preferably, for example, an UV light or an electron beam. When an electron beam is used for curing, an electron beam apparatus having an energy ray of 100 to 500 eV is preferably used. When an UV light is used for curing, an UV irradiation apparatus such as a high pressure mercury lamp, a xenon lamp, a metal halide lamp, or a light emitting diode is preferably used. The use of a light emitting diode emitting a bright line with a wavelength of 350 to 420 nm is preferred from the viewpoints of power saving and cost reduction. For example, when a light emitting diode emitting a bright line with a wavelength of 385 nm is used, curing using a light emitting diode having a radiation intensity of 5 to 20 mW/cm$^2$ at a conveyor carrying speed of 50 to 150 m/minute is preferred from the viewpoint of productivity.

In the method for producing a printed matter of the present invention, the ink is preferably active energy ray-curable printing ink including a pigment (a), a resin having an ethylenic unsaturated group (b), and a (meth)acrylate (c).

The ink used in the present invention preferably include the pigment (a). The pigment may be at least one selected from inorganic pigments and organic pigments.

Specific examples of the inorganic pigment used in the present invention include titanium oxide, zinc oxide, calcium carbonate, barium sulfate, red oxide, cadmium red, chrome yellow, zinc yellow, Berlin blue, ultramarine blue, organic bentonite, alumina white, iron oxide, carbon black, graphite, and aluminum.

Examples of the organic pigment include phthalocyanine-based pigments, soluble azo-based pigments, insoluble azo-based pigments, lake pigments, quinacridone-based pigments, isoindoline-based pigments, threne-based pigments, and metal complex-based pigments, and their specific examples include phthalocyanine blue, phthalocyanine green, azo red, monoazo red, monoazo yellow, disazo red, disazo yellow, quinacridone red, quinacridone magenta, and isoindoline yellow.

These pigments (a) may be used alone or in combination of two or more of them.

The content of the pigment (a) contained in the ink used in the present invention is preferably 5% by mass or more, more preferably 10% by mass or more, and even more preferably 15% by mass or more for achieving the concentration of the film surface to be printed. Additionally, the content is preferably 50% by mass or less, more preferably 45% by mass or less, and even more preferably 40% by mass or less for improving ink flowability and achieving good transferability between rollers.

The ink used in the present invention preferably includes a resin having an ethylenic unsaturated group (b). The ink including the resin having an ethylenic unsaturated group (b) has highly sensitive active energy ray curability and marked water resistance of the cured film.

The resin having an ethylenic unsaturated group (b) preferably has an ethylenic unsaturated group in its side chain, so that the resin having an ethylenic unsaturated group itself has curability by an active energy ray. Therefore, irradiation with an active energy ray cures the ink through the radical reaction between the resins with a high molecular weight, this reduces the radiation dose of the active energy ray necessary for curing, and as a result of this, the resin has high-sensitivity curability by an active energy ray.

For example, in UV printing wherein ink is instantaneously cured by irradiation with UV light as an active energy ray, sufficient ink curability is achieved even with a small dose of UV irradiation, this allows marked improvement of productivity through the improvement of the printing speed, and cost reduction through the application of a power-saving UV light source (for example, a metal halide lamp or LED).

On the other hand, for common active energy ray-curable ink, the ink is cured by radical reaction of a low molecular weight compound having an ethylenic unsaturated group, so that a heavy radiation dose is necessary for curing.

The resin having an ethylenic unsaturated group (b) preferably further has a carboxyl group. The ink including the resin having an ethylenic unsaturated group and a carboxyl group has water washability, marked toning resistance during offset printing, and marked adhesiveness to a film. The toning herein means adhesion of ink to the non-printing part of an offset printing plate to which the ink will not intrinsically adhere. As a result of adhesion of ink to the non-printing part of an offset printing plate, the ink is also transferred to a printed matter.

The resin having an ethylenic unsaturated group and a carboxyl group has a carboxyl group in its side chain, and thus is soluble in a water-based cleaning solution composed mainly of water, and allows the use of a non-petroleum cleaning solution. Furthermore, the carboxyl group interacts with the functional groups on the surface of the pigment in the ink, and thus can have good pigment dispersibility.

Additionally, the resin having an ethylenic unsaturated group and a carboxyl group improves viscosity properties of the ink through the hydrogen bonds between carboxyl groups, and thus contributes to the improvement of toning resistance in offset printing.

Furthermore, the resin having an ethylenic unsaturated group and a carboxyl group contains a carboxyl group, and thus achieves marked adhesiveness between the ink including the resin and the film. The reason for this is considered that a functional group derived from a compound containing a nitrogen atom such as an amino group is likely present because the nitrogen element concentration in the film surface is within the range of 0.5 to 10.0 atom %. The improvement of adhesiveness between the ink and film is likely due to bonding between the carboxyl groups contained in the resin in the ink and the amino groups existing on the film surface.

In prior art, for example, Patent Literature 1 studies the realization of water-washable and active energy ray-curable offset printing ink through solubilization of a resin in water, but the water-soluble resin cannot achieve sufficient curing of a film with an exposure dose using, for example, power saving UV in an actual UV printing machine, and water resistance of the cured film can be deficient.

On the other hand, in the ink preferably used in present invention, the resin having an ethylenic unsaturated group and a carboxyl group preferably has both of an ethylenic unsaturated group and a carboxyl group. Furthermore, control of the contents of the ethylenic unsaturated group and carboxyl group in the resin increases sensitivity of curing of the film by an active energy ray. This achieves high water resistance of a cured film even by, for example, exposure using power-saving UV, and provides water washability.

When the resin having an ethylenic unsaturated group (b) further has a carboxyl group, the acid value of the resin having an ethylenic unsaturated group (b) is preferably 30 mgKOH/g or more and 250 mgKOH/g or less. The acid value of the resin having an ethylenic unsaturated group (b) is preferably 30 mgKOH/g or more, more preferably 60 mgKOH/g or more, and even more preferably 75 mgKOH/g or more for achieving adhesiveness to a film, good solubility in water-based cleaning solutions for resins, pigment dispersibility, and toning resistance. Additionally, the acid value is preferably 250 mgKOH/g or less, more preferably 200 mgKOH/g or less, and even more preferably 150 mgKOH/g or less for achieving water resistance of the cured film. The acid value of the resin having an ethylenic unsaturated group (b) can be increased or decreased by the type and amount of the carboxyl group. The acid value of the resin having an ethylenic unsaturated group can be determined in accordance with the neutralization titration method of Section 3.1 of the test method in JIS K 0070:1992.

The iodine value of the resin having an ethylenic unsaturated group (b) is preferably 0.5 mol/kg or more and 3.0 mol/kg or less. The iodine value is preferably 0.5 mol/kg or more, and more preferably 1.0 mol/kg or more for achieving good sensitivity to an active energy ray. Additionally, the iodine value is preferably 3.0 mol/kg or less, more preferably 2.5 mol/kg or less, and even more preferably 2.0 mol/kg or less for achieving good ink storage stability. The iodine value of the resin having an ethylenic unsaturated group (b) can be increased or decreased by the type and amount of the ethylenic unsaturated group. The iodine value of the resin having an ethylenic unsaturated group (b) can be determined in accordance with the method of Section 6.0 of the test method in JIS K 0070:1992.

Specific examples of the backbone structure of the resin having an ethylenic unsaturated group (b) include, but not limited to, acrylic resins, styrene acrylic resins, styrene maleic acid resins, rosin-modified maleic acid resins, rosin-modified acrylic resins, epoxy resins, polyester resins, polyurethane resins, and phenolic resins. The resin having an ethylenic unsaturated group preferably has one or more backbone structure selected from acrylic resins, styrene acrylic resins, and styrene maleic acid resins.

Among the above-described resins, acrylic resins, styrene acrylic resins, and styrene maleic acid resins are preferred as the resin having an ethylenic unsaturated group (b) from the viewpoints of easy availability, low cost, easiness of synthesis, compatibility with other components of the ink, and pigment dispersibility of the monomer.

Specific examples of the resin having an ethylenic unsaturated group (b) include (meth)acrylate copolymers (including acrylic resins), (meth)acrylic acid-(meth)acrylate copolymers, styrene-(meth)acrylate copolymers (including styrene acrylic acid resins), styrene-(meth)acrylic acid-(meth)acrylate copolymers, styrene-maleic acid copolymers (including styrene maleic acid resins), styrene-maleic acid-(meth)acrylate copolymers, and styrene-maleic acid-(meth)acrylate copolymers.

In the present invention, the resin having an ethylenic unsaturated group (b) with a backbone structure selected from acrylic resins, styrene acrylic acid resins, and styrene maleic acid resins can be made by the following method. More specifically, a compound selected from carboxylic monomers such as acrylic acid, methacrylic acid, itaconic acid, crotonic acid, maleic acid, fumaric acid, vinyl acetate, and their anhydrides, hydroxylic monomers such as 2-hydroxyethyl acrylate, amino group-containing monomers such as dimethylaminoethyl methacrylate, mercapto group-containing monomers such as 2-(mercaptoacetoxy) ethyl acrylate, sulfo group-containing monomers such as acrylamide t-butylsulfonic acid, phosphate group-containing monomers such as 2-methacroiroxyethyl acid phosphate, methacrylates, acrylates, styrene, acrylonitrile, and vinyl acetate is polymerized or copolymerized using a radical polymerization initiator, and then the mercapto group, amino group, hydroxyl group, or carboxyl group, which is an active hydrogen-containing group in the polymer thus obtained, is subjected to addition reaction with an ethylenic unsaturated compound having a glycidyl group or an isocyanate group, acrylic acid chloride, methacrylic acid chloride, or allyl chloride, thereby obtaining the resin (b). However, the method will not be limited to these examples.

Specific examples of the ethylenic unsaturated compound having a glycidyl group include glycidyl acrylate, glycidyl methacrylate, allyl glycidyl ether, glycidyl crotonate, and glycidyl isocrotonate.

Specific examples of the ethylenic unsaturated compound having an isocyanate group include acryloyl isocyanate, methacryloyl isocyanate, acryloyl ethyl isocyanate, and methacryloyl ethyl isocyanate.

The weight average molecular weight of the resin having an ethylenic unsaturated group (b) is preferably 5,000 or more, more preferably 15,000 or more, and even more preferably 20,000 or more for achieving water resistance of the cured film. Additionally, the weight average molecular weight is preferably 100,000 or less, more preferably 75,000 or less, and even more preferably 50,000 or less for achieving water solubility of the resin. In the present description, the weight average molecular weight can be obtained by measurement by gel permeation chromatography (GPC) in terms of polystyrene.

The content of the resin having an ethylenic unsaturated group (b) in the ink used in the present invention is preferably 5% by mass or more, and more preferably 10% by mass or more for achieving the ink viscosity necessary for printing and sensitivity necessary for curing. Additionally, the content is preferably 60% by mass or less, more preferably 50% by mass or less, and even more preferably 40% by mass or less for achieving ink flowability and transferability between rollers necessary for printing.

The ink used in the present invention preferably includes a (meth)acrylate (c). When the ink includes the (meth)acrylate (c) in addition to the resin having an ethylenic unsaturated group (b), the ink has high-sensitivity active energy ray curability, and also has marked water resistance of the cured film.

The weight average molecular weight of the (meth)acrylate (c) is preferably 400 or more, and more preferably 600 or more for reducing contraction stress during curing, and improving adhesiveness. Additionally, the weight average molecular weight is preferably 3,000 or less, and more preferably 2,000 for achieving good active energy ray curability.

The (meth)acrylate (c) preferably has a hydroxyl group and/or a rosin skeleton, and more preferably has both of a rosin skeleton and a hydroxyl group. The ink including the (meth)acrylate having a hydroxyl group (c) has marked compatibility with the resin having an ethylenic unsaturated group (b), has both of uniform active energy ray curability and water washability, and has marked adhesiveness to a film. The reason for this is likely that hydrogen bonding of the hydroxyl group facilitates bonding between the hydroxyl group and the carbonyl group or amino group generated on the film surface upon corona discharge treatment of the film. Furthermore, the ink including the (meth)acrylate (c) having a rosin skeleton has a lower softening point in comparison with petroleum hydrocarbons having comparable molecular weights, and thus has marked transferability and adhesiveness with olefin-based substrates (films) having low polarity.

The hydroxyl value of the (meth)acrylate (c) having a rosin skeleton and a hydroxyl group is preferably 50 mgKOH/g or more for achieving compatibility with the resin having an ethylenic unsaturated group (b), and more preferably 75 mgKOH/g or more for achieving adhesiveness to a film. Additionally, the hydroxy value is preferably 150 mgKOH/g or less, and more preferably 100 mgKOH/g or less for achieving water resistance of the cured film. The hydroxyl value can be determined in accordance with the neutralization titration method of Section 7.1 of the test method in JIS K 0070:1992.

The number the (meth)acrylate-derived structure of the (meth)acrylate having a hydroxyl group and a rosin skeleton (hereinafter referred to as "functional group number") is preferably two or more for increasing the strength of the film cured by an active energy ray, thereby improving adhesiveness.

The (meth)acrylate having a rosin skeleton and a hydroxyl group (c) can be obtained by reaction between glycidyl (meth)acrylate and rosin such as gum rosin, wood rosin, or tall oil rosin, which are natural resins, and disproportionated, dimerized, polymerized, and hydrogenated products of the above-listed rosins. Since the rosins include the carboxylic compounds such as abietic acid, neoabietic acid, and levopimaric acid, the epoxy group is ring-opened by the reaction with glycidyl (meth)acrylate, and the (meth)acrylate thus obtained has a hydroxyl group. The number of the glycidyl (meth)acrylate to be reacted with rosin, more specifically, the functional group number of the (meth)acrylate having a hydroxyl group and a rosin skeleton is one or more, and preferably two or more. Alternatively, a (meth)acrylate having a hydroxyl group with a functional group number of 1 and a rosin skeleton and a (meth)acrylate having a hydroxyl group with a functional number of 2 and a rosin skeleton may be combined.

The loading of the (meth)acrylate having a rosin skeleton and a hydroxyl group (c) in the ink is preferably 5% by mass or more, and more preferably 15% by mass or more for improving adhesiveness to a film substrate. Additionally, the loading is preferably 50% by mass or less, and more preferably 40% by mass or less, for not impairing the ink viscosity and mechanical properties of the cured film.

The ink used in the present invention preferably further includes a (meth)acrylate (c) having a hydroxyl group and no rosin skeleton.

A polar group such as a hydroxyl group disperses and stabilizes a pigment, and thus improves ink flowability, and allows adjustment of ink physical properties such as viscosity and leveling property. Additionally, curing by irradiation with an active energy ray improves water resistance of the cured film.

The hydroxyl value of the (meth)acrylate (c) having a hydroxyl group and no rosin skeleton is preferably 50 mgKOH/g or more, more preferably 75 mgKOH/g or more, and even more preferably 100 mgKOH/g or more for improving pigment dispersibility. Additionally, the hydroxyl value is preferably 200 mgKOH/g or less, more preferably 180 mgKOH/g or less, and even more preferably 160 mgKOH/g or less for keeping good ink flowability.

Specific examples of the (meth)acrylate (c) having a hydroxyl group and no rosin skeleton include poly(meth)acrylates of polyhydric alcohols such as trimethylolpropane, glycerol, pentaerythritol, diglycerol, ditrimethylolpropane, isocyanuric acid, and dipentaerythritol, and alkylene oxide adducts of them. More specific examples include trimethylolpropane di(meth)acrylate, glycerol di(meth)acrylate, pentaerythritol di- or tri(meth)acrylate, diglycerol di- or tri(meth)acrylate, ditrimethylolpropane di- or tri(meth)acrylate, dipentaerythritol di-, tri-, tetra-, or penta(meth)acrylate, their ethylene oxide adducts, propylene oxide adducts, and tetraethylene oxide adducts. Additionally, (meth)acrylates obtained by reacting glycidyl (meth)acrylate with a compound having a plurality of hydroxyl groups and a carboxyl group. Examples of the compound having a plurality of hydroxyl groups and carboxyl groups include bisphenol A, hydrogenated bisphenol A, bisphenol F, and hydrogenated bisphenol F. More specific examples include bisphenol A di(meth)acrylate, bisphenol F di(meth)acrylate, hydrogenated bisphenol A di(meth)acrylate, hydrogenated bisphenol F di(meth)acrylate, and their ethylene oxide adducts, propylene oxide adducts, and tetraethylene oxide adducts. Among the above compounds, pentaerythritol tri(meth)acrylate, diglycerol tri (meth)acrylate, and ditrimethylolpropane tri (meth)acrylate are particularly preferred for achieving marked pigment dispersibility and improving toning resistance.

The loading of the (meth)acrylate (c) having a hydroxyl group and no rosin skeleton in the is preferably 10% by mass or more, more preferably 20% by mass or more, and even more preferably 30% by mass or more for achieving an ink viscosity suitable for printing. Additionally, the loading is preferably 70% by mass or less, more preferably 60% by mass or less, and even more preferably 50% by mass or less for obtaining a cured film having good sensitivity and sufficient water resistance.

In the ink used in the present invention, the (meth)acrylate (c) preferably has an alicyclic skeleton or an aliphatic skeleton with a carbon number of 6 to 18. The addition of the (meth)acrylate (c) having an alicyclic skeleton or an aliphatic skeleton with a carbon number of 6 to 18 decreases the ink viscosity and surface energy, whereby ink transferability and leveling property are improved. The (meth)acrylate (c) having an alicyclic skeleton or an aliphatic skeleton with a carbon number of 6 to 18 may be included together with at least one (meth)acrylate selected from the (meth)acrylate (c) and/or the (meth)acrylate (c) having a rosin skeleton and/or a hydroxyl group.

The viscosity of the (meth)acrylate having an alicyclic skeleton or an aliphatic skeleton with a carbon number of 6 to 18 (c) at 25° C. and 1 atm is preferably 50 mPa·s or more, and more preferably 100 mPa·s or more for keeping good toning resistance of the ink. Additionally, the viscosity is preferably 300 mPa·s or less, and more preferably 200 mPa·s or less for improving ink flowability and achieving good transferability and leveling property.

The alicyclic skeleton is preferably a tricyclodecane skeleton for reducing the volume shrinkage during curing, and achieving good physical properties of the film such as scratch resistance of the cured film.

Specific examples of the (c) (meth)acrylate having an alicyclic skeleton or a n aliphatic skeleton with a carbon number of 6 to 18 include monofunctional (meth)acrylates having an aliphatic skeleton with a carbon number of 6 to 18, such as hexyl (meth)acrylate, octyl (meth)acrylate, nonyl (meth)acrylate, dodecyl (meth)acrylate, stearyl (meth)acrylate, and isostearyl (meth)acrylate, monofunctional (meth)acrylates having an alicyclic skeleton, such as isobornyl (meth)acrylate, norbornyl (meth)acrylate, norbornane-2-methanol (meth)acrylate, cyclohexyl (meth)acrylate, tricyclopentenyl (meth)acrylate, dicyclopentenyl (meth)acrylate, tricyclopentenyloxy (meth)acrylate, and tricyclodecanemonomethylol (meth)acrylate. Examples of the bifunctional (meth)acrylate having an aliphatic skeleton with a carbon number of 6 to 18 include 1,6-hexanediol di(meth)acrylate, 1,9-nonanediol di(meth)acrylate, and examples of the bifunctional (meth)acrylate having an alicyclic skeleton include dicyclopentadiene tricyclodecanedimethanol di(meth)acrylate. Among them, tricyclodecane dimethanol di(meth)acrylate which has high sensitivity at an appropriate monomer viscosity is particularly preferred.

The content of the (meth)acrylate having an alicyclic skeleton or an aliphatic skeleton with a carbon number of 6 to 18 (c) in the ink used in the present invention is preferably 5% by mass or more, and more preferably 10% by mass or more for reducing the ink viscosity and surface tension, and improving transferability to a plastic film. Additionally, the content is preferably 20% by mass or less, and more preferably 15% by mass or less for keeping good toning resistance of the ink.

The ink used in the present invention preferably includes a photopolymerization initiator (d) for improving ink curability. Additionally, it may include a sensitizer for aiding the effect of the photopolymerization initiator (d).

Common examples of the photopolymerization initiator (d) include α-aminoalkylphenone-based initiators and thioxanthone-based initiators, which are preferably combined with an acylphosphine oxide compound. The acylphosphine oxide compound absorbs light in a long wavelength region of 350 nm or more, and thus has high sensitivity even in a system including a pigment which absorbs or reflects ultraviolet light. Additionally, the acylphosphine oxide compound has a photobleaching effect of eliminating light absorption after reaction, and thus exhibits marked internal curability due to this effect.

Specific examples of the α-aminoalkylphenone-based initiator include 2-benzyl-2-dimethylamino-1-(4-morpholinophenyl)-butanone-1, 2-dimethylamino-2-(4-methyl-benzyl)-1-(4-morpholine-4-yl-phenyl)-butane-1-one, and 2-methyl-1-[-4 (methylthio)phenyl]-2-morpholino propane-one. They may be used singly, or in combination of two or more of them. These polymerization initiators are preferred from the viewpoint of easy availability.

Examples of the thioxanthone-based initiator include 2,4-diethylthioxanthone, 2-isopropylthioxanthone, and 2-chlorothioxanthone.

In the ink, the content of the photopolymerization initiator (d) is preferably 0.1% by mass or more, more preferably 1% by mass or more, and even more preferably 3% by mass or more for achieving good sensitivity. Additionally, the content of the photopolymerization initiator (d) is preferably 20% by mass or less, more preferably 15% by mass or less, and even more preferably 10% by mass or less for improving storage stability of the ink.

Specific examples of the acylphosphine oxide compound include 2,4,6-trimethylbenzoyl-diphenyl-phosphine oxide, 2,6-dimethylbenzoyl-diphenyl-phosphine oxide, 2,6-dimethoxybenzoyl-diphenyl-phosphine oxide, benzoyl-diphenylphosphine oxide, 2,4,6-trimethylbenzoyl-bis(4-methoxyphenyl) phosphine oxide, 2,6-dimethylbenzoyl-bis(4-methoxyphenyl) phosphine oxide, 2,6-dimethoxybenzoyl-bis(4-methoxyphenyl) phosphine oxide, 2,4,6-trimethylbenzoyl-4-methoxyphenyl-phenyl-phosphine oxide, 2,6-dimethylbenzoyl-4-methoxyphenyl-phenyl-phosphine oxide, 2,6-dimethoxybenzoyl-4-methoxyphenyl-phenyl-phosphine oxide, 2,4,6-trimethylbenzoyl-dicyclohexyl-phosphine oxide, 2,6-dimethylbenzoyl-dicyclohexyl-phosphine oxide, 2,6-dimethoxybenzoyl-dicyclohexyl-phosphine oxide, benzoyl-bis(2,4,6-trimethylphenyl) phosphine oxide, bis(2,4,6-trimethylbenzoyl)-phenyl-phosphine oxide, bis(2,6-dimethylbenzoyl)-phenyl-phosphine oxide, bis(2,6-dimethoxybenzoyl)-phenyl-phosphine oxide, bis(2,4,6-trimethylbenzoyl)-2,4,4-trimethylpentyl-phosphine oxide, bis(2,6-dimethoxy benzoyl)-2,4,4-trimethylpentyl-phosphine oxide, and bis(2,6-dimethylbenzoyl)-2,4,4-trimethylpentyl-phosphine oxide. Among them, 2,4,6-trimethylbenzoyl-diphenyl-phosphine oxide, bis(2,4,6-trimethylbenzoyl)-phenyl-phosphine oxide, and bis(2,6-dimethoxybenzoyl)-2,4,4-trimethylpentyl-phosphine oxide are easily available and particularly preferred.

The acylphosphine oxide compound has marked internal curability owing to its photobleaching effect, and thus is preferably used in black ink having relatively low optical transparency. In particular, when ink is printed on a film and cured with an active energy ray, if curing of the ink is insufficient, adhesiveness between the ink and the film can be insufficient, so that the use of the acylphosphine oxide compound having marked internal curability is preferred.

In the ink, the content of the acylphosphine oxide compound may be established in independent from the content of the photopolymerization initiator (d). The content of the acylphosphine oxide compound is preferably 1% by mass or more, more preferably 3% by mass or more, and even more preferably 5% by mass or more for improving curing sensitivity of the ink to luminescence at 350 nm or more. Additionally, the content is preferably 20% by mass or less, more preferably 15% by mass or less, and even more preferably 10% by mass or less for keeping good ink flowability.

Specific examples of the sensitizer include 2,4-diethylthioxanthone, isopropylthioxanthone, 2,3-bis(4-diethylaminobenzal)cyclopentanone, 2,6-bis(4-dimethylaminobenzal)cyclohexanone, and 2,6-bis(4-dimethylaminobenzal)-4-methylcyclohexanone.

When the sensitizer is added, its content is preferably 0.1% by mass or more, more preferably 1% by mass or more, and even more preferably 3% by mass or more of the ink for achieving good sensitivity of the ink. Additionally, the content is preferably 20% by mass or less, more preferably 15% by mass or less, and even more preferably 10% by mass or less of the ink for improving storage stability of the ink.

The ink used in the present invention may include one or more kinds of the photopolymerization initiator (d) and the sensitizer.

The ink used in the present invention preferably includes one or more of the components selected from silicon liquids, vegetable oils, fatty acid esters derived from vegetable oils, hydrocarbon-based solvents, and fluorocarbons. More preferably, the ink includes one or more of the components selected from silicon liquids, hydrocarbon-based solvents, and fluorocarbons.

The component has an effect of decreasing ink adhesiveness to the silicone rubber, which is a non-printing part of a waterless offset printing plate. The reason for the decrease of ink adhesiveness to silicone rubber is considered as follows. More specifically, the component included in the ink is diffused from the ink upon contact with the silicone rubber surface, and covers the silicone rubber surface in the form of a thin film. The thin film thus formed likely inhibits adhesion of ink to the silicone rubber surface, and prevents toning of the silicon surface.

Specific compounds of the component are as follows. Examples of the silicon liquids include dimethylsilicon, methylphenyl silicon, and alkyl-modified silicon.

Examples of the vegetable oils include soybean oil, linseed oil, safflower oil, tung oil, tall oil, and dehydrated castor oil.

Examples of the fatty acid esters derived from vegetable oils include alkyl esters with a carbon number of about 1 to 10, such as methyl, ethyl, isobutyl, tert-butyl, 2-ethylhexyl esters of stearic acid, isostearic acid, hydroxy stearic acid.

Examples of the hydrocarbon-based solvent include polyolefin oil, naphthene oil, and paraffin oil.

Examples of the fluorocarbon include 1,1,1,2,2-pentafluoroethane, 5,6,6,7,7,8,8-heptadecafluorooctane, 1,1,1,2,3,3,4,4,5,5,6,6-dodecafluoro-2-trifluoromethyl hexane, and 1,1,2,2-tetrafluoroethane.

The ink used in the present invention preferably include one or more of the components selected from the above-described silicon liquids, vegetable oils, fatty acid esters derived from vegetable oils, hydrocarbon-based solvents, and fluorocarbons in an amount of 0.5% by mass or more for improving toning resistance. The content is more preferably 1% by mass or more, and even more preferably 2% by mass or more. Additionally, the content is preferably 10% by mass or less, more preferably 8% by mass or less, and even more preferably 5% by mass or less for improving storage stability of the ink.

The ink used in the present invention preferably includes a surfactant. The inclusion of a surfactant in the ink allows intake of an appropriate amount of wetting water (commonly 10 to 20% by mass of total ink amount) into ink and emulsification of it in offset printing, and this increases repulsiveness of the non-printing part and improves toning resistance of the ink.

The ratio between hydrophilic groups and hydrophobic groups of the surfactant is expressed by an HLB value. The HLB value herein represents a value representing the degree of affinity of the surfactant to water and oil, and takes a value from 0 to 20. The closer the HLB value to 0, the higher lipophilicity, and the close to 20, the higher hydrophilicity. The HLB value of the surfactant is preferably 8 or more for being soluble in water, more preferably 10 or more. Additionally, the HLB value is preferably 18 or less, and more preferably 16 or less for being soluble in the ink.

Specific examples of the surfactant include polyoxyethylene alkyl ether, polyoxyethylene lauryl ether, polyoxyethylene oleyl ether, polyoxyethylene stearyl ether, polyoxyalkylene palmitin ether, mono-, di-, trialkyl ether of sorbitan acid, mono-, di-, trilauryl ether of sorbitan acid, mono-, di-, tripalmitin ether of olyoxyethylene sorbitan acid, and polyether-modified silicon oil, and those having an HLB value of 8 or more and 18 or less are preferred.

The content of the surfactant in the ink used in the present invention is preferably 0.01% by mass or more, more preferably 0.05% by mass or more, and even more preferably 0.1% by mass or more for taking wetting water into offset printing and stabilizing the emulsified state. Additionally, the content is preferably 5% by mass or less more preferably 3% by mass or less, even more preferably 1% by mass or less, thereby preventing the ink from taking an excessive amount of wetting water and being compatible with it during printing.

The ink used in the present invention preferably includes a polymerization inhibitor. Specific examples of the polymerization inhibitor include hydroquinone, monoesterified hydroquinone, N-nitrosodiphenylamine, phenothiazine, P-t-butyl catechol, N-phenylnaphthylamine, 2,6-di-t-butyl-p-methylphenol, chloranil, and pyrogallol. When a polymerization inhibitor is added, its content is preferably 0.001% by mass or more of the ink for achieving good storage sensitivity of the ink, and preferably 5% by mass or less for achieving good sensitivity.

The ink used in the present invention preferably includes a pigment dispersant for increasing pigment dispersibility. The optimum content varies depending on, for example, the density, particle size, and surface area of the pigment used. The pigment dispersant acts on the surface of the pigment (a), and suppresses coagulation of the pigment (a). This increases pigment dispersibility, and improves flowability of the ink.

The content of the pigment dispersant is preferably 5% by mass or more and 50% by mass or less with reference to 100% by mass of the pigment (a) for improving flowability of the ink.

The viscosity of the ink used in the present invention is measured at 25° C. using a cone plate rotary viscometer. The viscosity at a rotation speed of 0.5 rpm is preferably 10 Pa·s or more and 100 Pa·s or less for achieving good flowability of the ink and good ink transferability. The viscosity is more preferably 95 Pa·s or less, even more preferably 80 Pa·s or less, and particularly preferably 60 Pa·s or less for improving flowability of the ink.

Furthermore, the ink used in the present invention may include, as necessary, additives such as a wax, an antifoaming agent, a transferability improver, and a leveling agent.

The method for producing ink used in the present invention is described below. The ink used in the present invention is obtained by dissolving the pigment (a), the resin having an ethylenic unsaturated group (b), the (meth)acrylate (c), and other components with warming as necessary at 5 to 100° C., and then uniformly mixing and dispersing them with a stirring or mulling machine such as a kneader, a three roll mill, a ball mill, a planetary ball mill, a bead mill, a roll mill, an attritor, a sand mill, a gate mixer, a paint shaker, a homogenizer, or a self-revolving stirrer. After mixing and dispersion, or during mixing and dispersion, defoaming in vacuum or under reduced pressure is preferred.

The ink used in the present invention can be applied to a film by a known method such as flexographic printing, offset printing, gravure printing, screen printing, or bar coating. In particular, offset printing is preferred because it allows high-speed and low-cost mass printing of ink. Offset printing include a system using a waterless offset printing plate, and a system using an offset printing plate. The method for producing a printed matter of the present invention preferably include a step of printing on a film using an offset printing plate.

The thickness of the ink on the printed matter is preferably from 0.1 to 50 μm. When the ink thickness is within the above-described range, the ink cost can be reduced while keeping good printing quality without decreasing adhesiveness between the ink and the film.

The printing machine for offset printing of the present invention preferably has a function of treating the film, which is to be printed with offset printing ink, by corona discharge in a mixed gas atmosphere having a mixing ratio of nitrogen to carbon dioxide ($N_2/CO_2$) of 99.5/0.5 to 50/50 in terms of the volume ratio, and an oxygen concentration of 0.1% by volume or less, and a function of radiating an active energy. The use of the printing machine is preferred because it allows free selection of the brand (type and characteristics) of the film, and immediate printing without deterioration after corona discharge treatment.

Additionally, it is more preferred that the printing machine have a function of continuously performing the steps of treating the film by corona discharge in a mixed gas substantially composed of nitrogen and carbon dioxide, printing the ink on a film, and radiating an active energy ray on a roll-to-roll system, thereby improving productivity of the printed matter.

FIG. 1 depicts a schematic view of a preferred embodiment of the printing machine. As depicted in FIG. 1, the printing machine preferably includes a film introduction unit 3 which introduces a film 1 from an unrolling roll 2 into the printing machine on a roll-to-roll system, a surface treatment unit 5 having a device 4 for corona discharge treatment in a mixed gas atmosphere having a mixing ratio ($N_2/CO_2$) of nitrogen to carbon dioxide of 99.5/0.5 to 50/50 in terms of the volume ratio and an oxygen concentration of 0.1% by volume or less, a printing unit 7 which print, for example, black ink (K), cyan ink (C), magenta ink (M), yellow ink (Y), and white ink (W), which are ejected from printing cylinders 6, on the film having a nitrogen element concentration of 0.5 to 10.0 atom % in the film surface, an ink curing part 9 which radiates an active energy ray from an active energy ray irradiator 8 such as an LED for curing the ink, and a film winding unit 11 which winds the film printed with the ink around a winding roll 10, these components being arranged in this order.

EXAMPLES

The present invention is more specifically described below by examples. However, the present invention is not limited to them.

<Ink Raw Material>

Pigment: LIONOL BLUE FG7330 (manufactured by Toyocolor Co., Ltd.)

Resin 1: A Resin Having an Ethylenic Unsaturated Group and a Carboxyl Group

Carboxyl groups of a copolymer composed of 25% by mass of methyl methacrylate, 25% by mass of styrene, and 50% by mass of methacrylic acid were subjected to addition reaction with 0.6 equivalent glycidyl methacrylate, thereby obtaining a resin 1 having an ethylenic unsaturated group and a hydrophilic group. The resin 1 thus obtained has a weight average molecular weight of 34,000, an acid value of 102 mgKOH/g, and an iodine value of 2.0 mol/kg.

Resin 2: A Resin Having an Ethylenic Unsaturated Group and No Carboxyl Group

Carboxyl groups of a copolymer composed of 25% by mass of methyl methacrylate, 25% by mass of styrene, and 50% by mass of methacrylic acid were subjected to subjected to addition reaction with 1.0 equivalent glycidyl methacrylate, thereby obtaining a resin 2 having an ethylenic unsaturated group. The resin 2 thus obtained had a weight average molecular weight of 40,000, an acid value of 0 mg KOH/g, and an iodine value of 3.2 mol/kg.

Resin 3: A Resin Having an Ethylenic Unsaturated Group and a Carboxyl Group

Carboxyl groups of a copolymer composed of 25% by mass of methyl methacrylate, 25% by mass of styrene, and 50% by mass of methacrylic acid were subjected to subjected to addition reaction with 0.95 equivalent glycidyl methacrylate, thereby obtaining a resin 3. The resin 3 thus obtained had a weight average molecular weight of 39,000, an acid value of 10 mgKOH/g, and an iodine value of 3.1 mol/kg.

Resin 4: A Resin Having an Ethylenic Unsaturated Group and a Carboxyl Group

Carboxyl groups of a copolymer composed of 25% by mass of methyl methacrylate, 25% by mass of styrene, and 50% by mass of methacrylic acid were subjected to addition reaction with 0.9 equivalent glycidylmethacrylate, thereby obtaining a resin 4. The resin 4 thus obtained had a weight average molecular weight of 38,000, an acid value of 35 mgKOH/g, and an iodine value of 2.9 mol/kg.

Resin 5: A Resin Having an Ethylenic Unsaturated Group and a Carboxyl Group

Carboxyl groups of a copolymer composed of 25% by mass of methyl methacrylate, 25% by mass of styrene, and 50% by mass of methacrylic acid were subjected to addition reaction with 0.2 equivalent glycidylmethacrylate, thereby obtaining a resin 5. The resin 5 thus obtained had a weight average molecular weight of 31,000, an acid value of 240 mgKOH/g, and an iodine value of 0.5 mol/kg.

Resin 6: A Resin Having an Ethylenic Unsaturated Group and a Carboxyl Group

Carboxyl groups of a copolymer composed of 25% by mass of methyl methacrylate, 25% by mass of styrene, and 50% by mass of methacrylic acid were subjected to addition reaction with 0.1 equivalent glycidylmethacrylate, thereby obtaining a resin 6. The resin 6 thus obtained had a weight average molecular weight of 30,000, an acid value of 259 mgKOH/g, and an iodine value of 0.25 mol/kg.

Resin 7: A Resin Having a Carboxyl Group and No Ethylenic Unsaturated Group

A copolymer (resin 7) composed of 25% by mass of methyl acrylate, 25% by mass of styrene, and 50% by mass of methacrylic acid was obtained. The resin 7 thus obtained had a weight average molecular weight of 29,000, an acid value of 282 mgKOH/g, and an iodine value of 0 mol/kg.

Hydroxyl rosin (meth)acrylate 1: a (meth)acrylate having a hydroxyl group and a rosin skeleton, BANBEAM UV-22A" (manufactured by Harima Chemicals Group, Inc.), hydroxyl value: 84 mg KOH/g, weight average molecular weight 1800

Hydroxyl rosin (meth)acrylate 2: a (meth)acrylate having a hydroxyl group and a rosin skeleton, BANBEAM UV-22C (manufactured by Harima Chemicals Group, Inc.), functional group number: 2 to 3, hydroxyl value: 70 mgKOH/g, weight average molecular weight: 760

Hydroxyl rosin (meth)acrylate 3: a (meth)acrylate having a hydroxyl group and a rosin skeleton, BEAMSET BS-101 (manufactured by Arakawa Chemical Industries, Ltd.) functional group number: 1, hydroxyl value: 125 mgKOH/g, weight average molecular weight: 430

Hydroxyl rosin (meth)acrylate 4: a (meth)acrylate having a hydroxyl group and a rosin skeleton, a reaction product obtained by adding 1.0 equivalent glycidyl methacrylate (GMA) to hydroxyl groups of PINE CRYSTAL KE-615-3 (manufactured by Arakawa Chemical Industries, Ltd., rosin-containing diol). Number of functional groups: 2, hydroxyl value: 32 mgKOH/g, weight average molecular weight: 1100

Hydroxyl rosin (meth)acrylate 5: a (meth)acrylate having a hydroxyl group and a rosin skeleton, a reaction product obtained by esterifying dimerized rosin with 0.5 equivalent pentaerythritol, and then adding 1.0 equivalent glycidyl methacrylate (GMA) to the hydroxyl groups. The functional group number: 2 to 4, hydroxyl value: 53 mgKOH/g, weight average molecular weight: 3500

Hydroxyl (meth)acrylate 1: a (meth)acrylate having a hydroxyl group, a mixture of pentaerythritol triacrylate and pentaerythritol tetraacrylate "Miramer" (registered trademark) M340 (manufactured by Miwon Specialty Chemical Co., Ltd.), no rosin skeleton, functional group number: 3 to 4, hydroxyl value: 115 mgKOH/g Hydroxyl (meth)acrylate 2: a (meth)acrylate having a hydroxyl group, a mixture of dipentaerythritol pentaacrylate and dipentaerythritol hexaacrylate "ARONIX" (registered trademark) M-402 (manufactured by Toagosei Co., Ltd.), no rosin skeleton, functional group number: 5 to 6, hydroxyl value: 28 mgKOH/g Hydroxyl (meth)acrylate 3: a (meth)acrylate having a hydroxyl group, a mixture of dipentaerythritol pentaacrylate and dipentaerythritol hexaacrylate "ARONIX" (registered trademark) M-403A (manufactured by Toagosei Co., Ltd.), no rosin skeleton, functional group number: 5 to 6, hydroxyl value: 53 mgKOH/g Hydroxyl (meth)acrylate 4: a (meth)acrylate having a hydroxyl group, a mixture of pentaerythritol triacrylate and pentaerythritol tetraacrylate "ARONIX" (registered trademark) M-306 (manufactured by Toagosei Co., Ltd.), no rosin skeleton, functional group number: 3 to 4, hydroxyl value: 171 mg KOH/g Hydroxyl (meth)acrylate 5: a (meth)acrylate having a hydroxyl group, glycerol dimethacrylate "NK ESTER" (registered trademark) 701 (manufactured by Shin-Nakamura chemical Co., Ltd.), no rosin skeleton, functional group number: 2, hydroxyl value: 224 mgKOH/g Alicyclic (meth)acrylate 1: a (meth)acrylate having an alicyclic structure, tricyclodecane dimethanol diacrylate "NK ESTER" (registered trademark) A-DCP (manufactured by Shin-Nakamura chemical Co., Ltd.), no rosin skeleton or hydroxyl group, functional group number: 2

Alicyclic (meth)acrylate 2: a (meth)acrylate having an alicyclic structure, dicyclopentanyl acrylate "FANCRYL" (registered trademark) FA-513AS (manufactured by Hitachi Chemical Co., Ltd.), no rosin skeleton or hydroxyl group, functional group number 1

Aliphatic (meth)acrylate 1: a (meth)acrylate having an aliphatic skeleton, 1,6-hexanediol diacrylate "NK ESTER" (registered trademark) A-HD-N (manufactured by Shin-Nakamura chemical Co., Ltd.), no rosin skeleton or hydroxyl group, functional group number: 2

Aliphatic (meth)acrylate 2: a (meth)acrylate having an aliphatic skeleton, 1,9-nonanediol diacrylate "NK ESTER" (registered trademark) A-NOD-N (manufactured by Shin-Nakamura chemical Co., Ltd.), no rosin skeleton or hydroxyl group, functional group number: 2

Photopolymerization initiator 1: 2,4,6-trimethylbenzoyl-diphenyl-phosphine oxide "LUCIRIN" (registered trademark) TPO (manufactured by BASF)

Photopolymerization initiator 2: 2-[4-(methylthio)benzoyl]-2-(4-morpholinyl)propane "IRGACURE" (registered trademark) 907 (manufactured by BASF)

Sensitizer 1: 4,4-bis(diethylamino)benzophenone (manufactured by Hodogaya Chemical Co., Ltd.)

Body pigment: "MICROACE" (registered trademark) P-3 (manufactured by Nippon Talc Co., Ltd.)

Polymerization inhibitor: p-methoxyphenol (manufactured by Wako Pure Chemical Industries, Ltd.)

Pigment dispersant: "Disperbyk" (registered trademark) 111 (manufactured by BYK-Chemie)

Additive: lauryl acrylate (manufactured by Wako Pure Chemical Industries, Ltd.)

Wax: "KTL" (registered trademark) 4N (manufactured by Kitamura Limited)

<Measurement of Weight Average Molecular Weight>

The weight average molecular weight of the resin was the value measured by gel permeation chromatography (GPC) using tetrahydrofuran as the mobile phase. GPC used HLC-8220 (manufactured by Tosoh Corporation), columns used TSKgel Super HM-H (manufactured by Tosoh Corporation), TSK gelSuperHM-H (manufactured by Tosoh Corporation), and TSK gel Super H2000 (manufactured by Tosoh Corporation) which were connected in this order, and RI detection used an RI detector integrated in the above-described GPC. The calibration curve was drawn using a polystyrene reference material, and the weight average molecular weight of the sample was calculated. The method for preparing the sample is as follows. The sample was diluted with tetrahydrofuran to make the concentration 0.25% by mass, the diluted solution was stirred with a mix rotor (MIX-ROTAR VMR-5, manufactured by AS ONE Corporation) for 5 minutes at 100 rpm, filtered through a 0.2-μm filter (Z227536-100EA, manufactured by SIGMA), and the filtrate was used as the sample. The measurement conditions are as follows; the injection volume was 10 μL, the analysis time was 30 minutes, the flow rate was 0.4 mL/min, and the column temperature was 40° C.

<Measurement of Elemental Composition of Film Surface and Nitrogen Element Concentration>

The measurement conditions for the elemental composition of the film surface using X-ray photoelectron spectroscopy (XPS) are as follows.

Apparatus: Quantera SXM (ULVAC-PHI, Incorporated)

Excitation X-ray: monochromatic Al K$\alpha_{1,2}$ line (1486.6 eV)

X-ray output: 51.5 W

X-ray diameter: 200 μm

Photoelectron escape angle (inclination of detector to the film surface): 45°

The result obtained by XPS was subjected to smoothing and abscissa correction using a nine-point smoothing filter under conditions that the C1s main peak was 284.6 eV. The average nitrogen element concentration in the film surface was measured by the XPS analysis and data processing.

<Film Surface Treatment>

Film surface treatment was carried out in an atmosphere of a supply gas adjusted according to the following conditions using a corona discharge treatment apparatus capable of adjusting the atmosphere of the supply gas. According to the conditions of corona discharge treatment, the electrode-film distance was 1 mm, the film transfer rate was 100 m/min, and the application electrical energy was 3600 J/m$^2$.

<Atmosphere of Supply Gas During Surface Treatment>

The mixed gas atmosphere for carrying out corona discharge treatment was any of the following treatment conditions 1 to 10. In the following mixed gas atmospheres, other gases excluding nitrogen, carbon dioxide, and oxygen are below the detection limit, and the proportions (% by volume) of nitrogen and carbon dioxide with the total of nitrogen and carbon dioxide 100% by volume was recorded.

Treatment conditions 1: mixed gas composed of 90% by volume of nitrogen and 10% by volume of carbon dioxide with a residual oxygen concentration of 0.01% by volume and a relative humidity of 0.03% RH or less Treatment conditions 2: mixed gas composed of 99.2% by volume of nitrogen and 0.8% by volume of carbon dioxide with a residual oxygen concentration of 0.01% by volume and a relative humidity of 0.03% RH or less Treatment conditions 3: mixed gas composed of 95% by volume of nitrogen and 5% by volume of carbon dioxide with a residual oxygen concentration of 0.01% by volume and a relative humidity of 0.03% RH or less Treatment conditions 4: mixed gas composed of 80% by volume of nitrogen and 20% by volume of carbon dioxide with a residual oxygen concentration of 0.01% by volume and a relative humidity of 0.03% RH or less Treatment conditions 5: mixed gas composed of 55% by volume of nitrogen and 45% by volume of carbon dioxide with a residual oxygen concentration of 0.01% by volume and a relative humidity of 0.03% RH or less Treatment conditions 6: mixed gas composed of 90% by volume of nitrogen and 10% by volume of carbon dioxide with a residual oxygen concentration of 0.1% by volume and a relative humidity of 0.03% RH or less Treatment conditions 7: mixed gas composed of 99.9% by volume of nitrogen and 0.1% by volume of carbon dioxide with a residual oxygen concentration of 0.01% by volume and a relative humidity of 0.03% RH or less Treatment conditions 8: mixed gas composed of 40% by volume of nitrogen and 60% by volume of carbon dioxide with a residual oxygen concentration of 0.01% by volume and a relative humidity of 0.03% RH or less Treatment conditions 9: mixed gas composed of 90% by volume of nitrogen and 10% by volume of carbon dioxide with a residual oxygen concentration of 0.3% by volume and a relative humidity of 0.03% RH or less Treatment conditions 10: air atmosphere <Film to be Treated>

Film 1: a polyester film "LUMIRROR" (registered trademark) S10 (manufactured by Toray Industries, Inc.) coated with an acrylic urethane copolymer resin by blade coating, the nitrogen element concentration in the film surface is 3.0 atom %, and the film thickness is 20 μm.

Film 2: a polyamide film "EMBLEM" (registered trademark) ON (manufactured by Unitika, Ltd.) coated with polyester-based polyurethane by blade coating, the nitrogen element concentration in the film surface is 5.0 atom %, and the film thickness is 15 μm.

Film 3: a polyester film "LUMIRROR" (registered trademark) S10 (manufactured by Toray Industries, Inc.) coated with a mixture of a melamine compound and a polyester resin by blade coating, the nitrogen element concentration in the film surface is 1.0 atom %, and the film thickness is 20 μm.

Film 4: together with a predetermined polypropylene raw material, stearyl diethanolamine monostearate was added in the proportion described below (input, % by mass) to the polypropylene raw material (100% by mass), melt-extruded at 280° C., ejected in the form of a sheet from a mouthpiece having a slit-shaped ejecting port, and molded under cooling on a cooling drum with a surface temperature of 30° C., thereby obtaining an unstretched sheet. Subsequently, the unstretched sheet thus obtained was preheated, and then stretched five times at 135° C. in a longitudinal direction to make an uniaxially oriented film. The uniaxially oriented film thus obtained was stretched ten times in a width direction in a tenter heated at 160° C., heat-treated at 150° C. while allowing width direction relaxation of several percent to make a biaxially stretched polypropylene film, one side is subjected to corona discharge treatment under the treatment conditions 10, and then the film was taken up. The thickness of the films was 20 μm, and the nitrogen element concentrations in the film surface are described below.

Film 4-1: input 1.0% by mass, nitrogen element concentration in the film surface 2.0 atom %

Film 4-2: input 0.5% by mass, nitrogen element concentration in the film surface 1.0 atom %

Film 4-3: input 2.0% by mass, nitrogen element concentration in the film surface 4.0 atom %

Film 4-4: input 3.0% by mass, nitrogen element concentration in the film surface 6.0 atom %

Film 4-5: input 0.1% by mass, nitrogen element concentration in the film surface 0.2 atom %

Film 5: a polypropylene film "TORAYFAN" (registered trademark) 2500 (Toray Industries, Inc.) having a film thickness of 15 μm was subjected to corona discharge treatment under the following conditions, thus obtaining the films having the nitrogen element concentrations in the film surfaces listed below.

Film 5-1: treatment conditions 1, nitrogen element concentration in the film surface 0.9 atom %

Film 5-2: treatment conditions 2, nitrogen element concentration in the film surface 1.0 atom %

Film 5-3: treatment conditions 3, nitrogen element concentration in the film surface 0.95 atom %

Film 5-4: treatment conditions 4, nitrogen element concentration in the film surface 0.8 atom %

Film 5-5: treatment conditions 5, nitrogen element concentration in the film surface 0.6 atom %

Film 5-6: treatment conditions 6, nitrogen element concentration in the film surface 0.5 atom %

Film 5-7: treatment conditions 7, nitrogen element concentration in the film surface 1.0 atom %

Film 5-8: treatment conditions 8, nitrogen element concentration in the film surface 0.3 atom %

Film 5-9: treatment conditions 9, nitrogen element concentration in the film surface 0.2 atom %

Film 5-10: treatment conditions 10, nitrogen element concentration in the film surface 0.0 atom %

<Sensitivity>

For the films of Examples 1 to 33 and Comparative Examples 1 to 4, 0.1 g of the ink of Examples 1 to 33 and Comparative Examples 1 to 4 shown in Tables 1 to 8 was mounted on the roll of a RI tester (PI-600, manufactured by Tester Sangyo Co., Ltd.), transferred to the films, and then irradiated with UV light at a belt conveyor speed of 0 to 150 m/minute using a UV irradiation apparatus manufactured by USHIO Inc. (120 W/cm, equipped with an ultrahigh pressure metal halide lamp). After the ink on the printed matter was thoroughly cured, the belt conveyor speed was determined when the ink cured film did not peel even a cellophane adhesive tape ("CELLOTAPE" (registered trademark) No. 405) was attached to and released from the ink cured film. The faster the belt conveyor speed, the higher the sensitivity because the ink is cured with a less amount of exposure dose. When the belt conveyor speed was less than 90 m/minute, the sensitivity was rated as insufficient, when 90 m/minute or more and less than 120 m/minute, the sensitivity was rated good, and when 120 m/minute or more, the sensitivity was rated as very good because the ink is applicable to power-saving UV printing machines.

<Transferability>

Using the ink and films of Examples 1 to 33 and Comparative Examples 1 to 4, the film weight was measured in advance, 0.1 g of the ink was mounted on the roller of an RI tester (PI-600, manufactured by Tester Sangyo Co., Ltd.), transferred to the film, and then the ink weight transferred to the film was measured, the transfer rate from the roller was determined, thus evaluating ink transferability. When the ink transfer rate was less than 10% by mass, transferability was rated insufficient, when the transfer rate was 10% by mass or more and less than 12% by mass, transferability was rated good, and when the transfer rate was 12% by mass or more, transferability was rated very good.

<Peel Strength>

The peel strength test and evaluation of the ink cured film on the printed matter were carried out in accordance with the specifications number JIS K 6854-2: 1999, name of specification: Adhesive-Peel Adhesion Strength Test Method-Part 2: 180° Peeling. Using the ink and films of Examples 1 to 33 and Comparative Examples 1 to 4, 0.1 of the ink was placed on the roller of an RI tester (PI-600, manufactured by Tester Sangyo Co., Ltd.), transferred to a film, and then the ink was cured using a UV irradiation device manufactured by USHIO Inc. (120 W/cm, ultrahigh pressure metal halide lamp: one) at a belt conveyor speed of 50 m/minute, thus making a printed matter. A laminate film coated with a 2-pack adhesive (LX-500/KR-905: manufactured by DIC Corporation) was bonded to the surface of the printed matter, and was allowed to stand in an oven at 60° C. for 60 minutes for curing, thus making a sample for peel strength evaluation. The sample was cut with a cutter to a width of 15 mm, and the peel strength between the printed matter and the film was measured. The measurement used a tensile tester, and a 180° peel test was carried out at a loading speed of 100 mm/minute. When the peel strength was less than 1 N/15 mm, the adhesiveness was rated quite insufficient, when less than 1 N/15 mm or more and less than 3 N/15 mm, adhesiveness was rated insufficient, when 3 N/15 mm or more and less than 5 N/15 mm, the adhesiveness was rated good, when 5 N/15 mm or more, the adhesiveness was rated very good.

Example 1

The ink composition shown in Table 1 was weighed, and kneaded three times using a three roll mill "EXAKT" (registered trademark) M-80S (manufactured by EXAKT Technologies, Inc.) with the roller gap scale of the apparatus set at 1, and at a rotation speed of 400 rpm.

The sensitivity of the ink thus produced was 120 m/minute in terms of the belt conveyor speed, so that the sensitivity was very good. The transfer rate was 11.3% by mass, so that the transferability was good. The peel strength was 3.8 N/15 mm, so that the adhesiveness to a film was also good.

Examples 2 and 3

The printing experiment was carried out, and sensitivity, transferability, adhesiveness to film were evaluated in the same manner as in Example 1, except that the type of the film was changed to 2 and 3.

The sensitivity of the ink thus produced was 120 m/minute in terms of the belt conveyor speed, and both examples were rated very good. The transfer rate of both examples was 10% by mass or more, so that their transferability was good. The peel strength of both samples was 3 N/15 mm or more, so that their adhesiveness to a film was good.

The composition of the components used in Examples 2 and 3 and the results of evaluations are shown in Table 1.

TABLE 1

| | | Example | | |
|---|---|---|---|---|
| | | 1 | 2 | 3 |
| Composition | Pigment | 17.8 | 17.8 | 17.8 |
| (% by mass) | Resin 1 | 11.8 | 11.8 | 11.8 |
| | Hydroxyl (meth)acrylate 1 | 53.3 | 53.3 | 53.3 |
| | Body pigment | 2.0 | 2.0 | 2.0 |
| | Photopolymerization initiator 1 | 7.0 | 7.0 | 7.0 |
| | Polymerization inhibitor | 0.1 | 0.1 | 0.1 |
| | Pigment dispersant | 3.0 | 3.0 | 3.0 |
| | Additive | 4.0 | 4.0 | 4.0 |
| | Wax | 1.0 | 1.0 | 1.0 |

TABLE 1-continued

| | | Example | | |
|---|---|---|---|---|
| | | 1 | 2 | 3 |
| Film | Film type (No.) | 1 | 2 | 3 |
| | Conditions of corona discharge treatment | — | — | — |
| | Nitrogen element concentration (atom %) | 3.0 | 5.0 | 1.0 |
| Evaluation | Sensitivity [conveyor speed (m/minute)] | 120 | 120 | 120 |
| | Transfer ratio (% by mass) | 11.3 | 11.5 | 11.2 |
| | Peel strength (N/15 mm) | 3.8 | 4.2 | 3.6 |

Examples 4 to 7

The printing experiment was carried out, and sensitivity, transferability, adhesiveness to film were evaluated in the same manner as in Example 1, except that the type of the film was changed to 4-1 to 4-4.

The sensitivity of the ink thus produced was 120 m/minute in terms of the belt conveyor speed, and all the examples were rated very good. In Example 7 using the film 4-4 with an input of stearyl diethanolamine monostearate of 3.0% by mass, the transfer rate tended to decrease, but the transfer rates in Examples 4 to 7 were 10% by mass or more, so that their transferability was good. The peel strength of all the examples was 3 N/15 mm or more, so that their adhesiveness to a film was good.

The composition of the components used in Examples 4 to 7 and evaluation results are shown in Table 2.

TABLE 2

| | | Example | | | |
|---|---|---|---|---|---|
| | | 4 | 5 | 6 | 7 |
| Composition | Pigment | 17.8 | 17.8 | 17.8 | 17.8 |
| (% by mass) | Resin 1 | 11.8 | 11.8 | 11.8 | 11.8 |
| | Hydroxyl (meth)acrylate 1 | 53.3 | 53.3 | 53.3 | 53.3 |
| | Body pigment | 2.0 | 2.0 | 2.0 | 2.0 |
| | Photopolymerization initiator 1 | 7.0 | 7.0 | 7.0 | 7.0 |
| | Polymerization inhibitor | 0.1 | 0.1 | 0.1 | 0.1 |
| | Pigment dispersant | 3.0 | 3.0 | 3.0 | 3.0 |
| | Additive | 4.0 | 4.0 | 4.0 | 4.0 |
| | Wax | 1.0 | 1.0 | 1.0 | 1.0 |
| Film | Film type (No.) | 4-1 | 4-2 | 4-3 | 4-4 |
| | Conditions of corona discharge treatment | 10 | 10 | 10 | 10 |
| | Nitrogen element concentration (atom %) | 2.0 | 1.0 | 4.0 | 6.0 |
| Evaluation | Sensitivity [conveyor speed (m/minute)] | 120 | 120 | 120 | 120 |
| | Transfer ratio (% by mass) | 11.8 | 11.5 | 11.0 | 10.2 |
| | Peel strength (N/15 mm) | 4.1 | 3.1 | 4.3 | 4.4 |

Examples 8 to 14

The printing experiment was carried out, and sensitivity, transferability, adhesiveness to film were evaluated in the same manner as in Example 1, except that the type of the film was changed to 5-1 to 5-7.

The sensitivity of the ink thus produced was 120 m/minute in terms of the belt conveyor speed, and all the examples were rated very good. Example 14 using the film 5-7 obtained by corona discharge treatment under the conditions 7 with a high nitrogen concentration of the mixed gas atmosphere in film treatment exhibited an insufficient transfer rate. Examples 8 to 13 achieved good transferability, but Example 9 using the film 5-2 obtained by corona discharge treatment under the conditions 2 with a high nitrogen concentration in film treatment showed a tendency of decrease of transferability. All the examples showed a peel strength of 3 N/15 mm or more, and good adhesiveness to a film, but Example 12 using the film 5-5 obtained by corona discharge treatment under the conditions 5 with a high carbon dioxide concentration of the mixed gas atmosphere and Example 13 using the film 5-6 using the film 5-5 obtained by corona discharge treatment under the conditions 6 with a high residual oxygen concentration showed a tendency of decrease of adhesiveness to a film.

The composition of the components used in Examples 8 to 14 and evaluation results are shown in Table 3.

TABLE 3

|  |  | Example | | | | | | |
|---|---|---|---|---|---|---|---|---|
|  |  | 8 | 9 | 10 | 11 | 12 | 13 | 14 |
| Composition (% by mass) | Pigment | 17.8 | 17.8 | 17.8 | 17.8 | 17.8 | 17.8 | 17.8 |
|  | Resin 1 | 11.8 | 11.8 | 11.8 | 11.8 | 11.8 | 11.8 | 11.8 |
|  | Hydroxyl (meth)acrylate 1 | 53.3 | 53.3 | 53.3 | 53.3 | 53.3 | 53.3 | 53.3 |
|  | Body pigment | 2.0 | 2.0 | 2.0 | 2.0 | 2.0 | 2.0 | 2.0 |
|  | Photopolymerization initiator 1 | 7.0 | 7.0 | 7.0 | 7.0 | 7.0 | 7.0 | 7.0 |
|  | Polymerization inhibitor | 0.1 | 0.1 | 0.1 | 0.1 | 0.1 | 0.1 | 0.1 |
|  | Pigment dispersant | 3.0 | 3.0 | 3.0 | 3.0 | 3.0 | 3.0 | 3.0 |
|  | Additive | 4.0 | 4.0 | 4.0 | 4.0 | 4.0 | 4.0 | 4.0 |
|  | Wax | 1.0 | 1.0 | 1.0 | 1.0 | 1.0 | 1.0 | 1.0 |
| Film substrate | Film type (No.) | 5-1 | 5-2 | 5-3 | 5-4 | 5-5 | 5-6 | 5-7 |
|  | Conditions of corona discharge treatment | 1 | 2 | 3 | 4 | 5 | 6 | 7 |
|  | Nitrogen element concentration (atom %) | 1.5 | 1.6 | 1.5 | 1.4 | 0.8 | 0.5 | 1.6 |
| Evaluation | Sensitivity [conveyor speed (m/minute)] | 120 | 120 | 120 | 120 | 120 | 120 | 120 |
|  | Transfer ratio (% by mass) | 11.4 | 10.2 | 11.2 | 11.3 | 11.4 | 11.2 | 9.4 |
|  | Peel strength (N/15 mm) | 3.8 | 3.9 | 3.9 | 3.7 | 3.2 | 3.0 | 3.9 |

Comparative Example 1

The printing experiment was carried out, and sensitivity, transferability, adhesiveness to film were evaluated in the same manner as in Example 1, except that the type of the film was changed to 4-5. The sensitivity of the ink thus produced was 120 m/minute in terms of the belt conveyor speed, and was rated very good. Additionally, the transfer rate was 11.8% by mass, so that transferability was good. However, the peel strength was 2.1 N/15 mm, so that the peel strength was insufficient.

Comparative Example 2

The printing experiment was carried out, and sensitivity, transferability, adhesiveness to film were evaluated in the same manner as in Example 1, except that the type of the film was changed to 5-8. The sensitivity of the ink thus produced was 120 m/minute in terms of the belt conveyor speed, and was rated very good. Additionally, the transfer rate was 11.6% by mass, so that transferability was good. However, the peel strength was 2.3 N/15 mm, so that adhesiveness to a film was insufficient.

Comparative Example 3

The printing experiment was carried out, and sensitivity, transferability, adhesiveness to film were evaluated in the same manner as in Example 1, except that the type of the film was changed to 5-9. The sensitivity of the ink thus produced was 120 m/minute in terms of the belt conveyor speed, and was rated very good. Additionally, the transfer rate was 10.9% by mass, so that transferability was good. However, the peel strength was 1.8 N/15 mm, so that adhesiveness to a film was insufficient.

Comparative Example 4

The printing experiment was carried out, and sensitivity, transferability, adhesiveness to film were evaluated in the same manner as in Example 1, except that the type of the film was changed to 5-10. The sensitivity of the ink thus produced was 120 m/minute in terms of the belt conveyor speed, and was rated very good. However, the transfer rate was 9.2% by mass, so that transferability was insufficient. Additionally, the peel strength was 0.8 N/15 mm, so that adhesiveness to a film was markedly insufficient.

The composition of the components used in Comparative Examples 1 to 4 and evaluation results are shown in Table 4.

TABLE 4

|  |  | Comparative Example | | | |
|---|---|---|---|---|---|
|  |  | 1 | 2 | 3 | 4 |
| Composition (% by mass) | Pigment | 17.8 | 17.8 | 17.8 | 17.8 |
|  | Resin 1 | 11.8 | 11.8 | 11.8 | 11.8 |
|  | Hydroxyl (meth)acrylate 1 | 53.3 | 53.3 | 53.3 | 53.3 |
|  | Body pigment | 2.0 | 2.0 | 2.0 | 2.0 |
|  | Photopolymerization initiator 1 | 7.0 | 7.0 | 7.0 | 7.0 |
|  | Polymerization inhibitor | 0.1 | 0.1 | 0.1 | 0.1 |
|  | Pigment dispersant | 3.0 | 3.0 | 3.0 | 3.0 |
|  | Additive | 4.0 | 4.0 | 4.0 | 4.0 |
|  | Wax | 1.0 | 1.0 | 1.0 | 1.0 |
| Film substrate | Film type (No.) | 4-5 | 5-8 | 5-9 | 5-10 |
|  | Conditions of corona discharge treatment | 10 | 8 | 9 | 10 |
|  | Nitrogen element concentration (atom %) | 0.2 | 0.3 | 0.2 | 0.0 |

TABLE 4-continued

|  |  | Comparative Example | | | |
|---|---|---|---|---|---|
|  |  | 1 | 2 | 3 | 4 |
| Evaluation | Sensitivity [conveyor speed (m/minute)] | 120 | 120 | 120 | 120 |
|  | Transfer ratio (% by mass) | 11.8 | 11.6 | 10.9 | 9.2 |
|  | Peel strength (N/15 mm) | 2.1 | 2.3 | 1.8 | 0.8 |

Examples 15 to 20

The printing experiment was carried out, and sensitivity, transferability, adhesiveness to film were evaluated in the same manner as in Example 1, except that the resin 1 was changed to the resin 2 to resin 7.

With the increase of the iodine value, the sensitivity tended to improve, and with the increase of the acid value, the adhesiveness tended to improve. Examples 20 including the resin 7 having an iodine value of 0 mol/kg showed a belt conveyor speed of 75 m/minute, so that the sensitivity was insufficient. The transfer rate of all the examples was 10% by mass or more, so that the transferability was good. Examples 15 and 16 respectively including the resin 2 (iodine value: 3.2 mol/kg) and the resin 3 (iodine value: 3.1 mol/kg) showed very good sensitivity.

The composition of the components used in Examples 15 to 20 and evaluation results are shown in Table 5.

TABLE 5

|  |  | Example | | | | | |
|---|---|---|---|---|---|---|---|
|  |  | 15 | 16 | 17 | 18 | 19 | 20 |
| Composition (% by mass) | Pigment | 17.8 | 17.8 | 17.8 | 17.8 | 17.8 | 17.8 |
|  | Resin 2 | 11.8 | — | — | — | — | — |
|  | Resin 3 | — | 11.8 | — | — | — | — |
|  | Resin 4 | — | — | 11.8 | — | — | — |
|  | Resin 5 | — | — | — | 11.8 | — | — |
|  | Resin 6 | — | — | — | — | 11.8 | — |
|  | Resin 7 | — | — | — | — | — | 11.8 |
|  | Hydroxyl (meth)acrylate 1 | 53.3 | 53.3 | 53.3 | 53.3 | 53.3 | 53.3 |
|  | Body pigment | 2.0 | 2.0 | 2.0 | 2.0 | 2.0 | 2.0 |
|  | Photopolymerization initiator 1 | 7.0 | 7.0 | 7.0 | 7.0 | 7.0 | 7.0 |
|  | Polymerization inhibitor | 0.1 | 0.1 | 0.1 | 0.1 | 0.1 | 0.1 |
|  | Pigment dispersant | 3.0 | 3.0 | 3.0 | 3.0 | 3.0 | 3.0 |
|  | Additive | 4.0 | 4.0 | 4.0 | 4.0 | 4.0 | 4.0 |
|  | Wax | 1.0 | 1.0 | 1.0 | 1.0 | 1.0 | 1.0 |
| Film substrate | Film type (No.) | 5-1 | 5-1 | 5-1 | 5-1 | 5-1 | 5-1 |
|  | Conditions of corona discharge treatment | 1 | 1 | 1 | 1 | 1 | 1 |
|  | Nitrogen element concentration (atom %) | 1.5 | 1.5 | 1.5 | 1.5 | 1.5 | 1.5 |
| Evaluation | Sensitivity [conveyor speed (m/minute)] | 160 | 150 | 140 | 100 | 90 | 75 |
|  | Transfer ratio (% by mass) | 11.4 | 11.4 | 11.2 | 11.3 | 11.4 | 11.5 |
|  | Peel strength (N/15 mm) | 3.2 | 3.3 | 3.5 | 4.1 | 4.1 | 4.2 |

Examples 21 to 24

The printing experiment was carried out, and sensitivity, transferability, adhesiveness to film were evaluated in the same manner as in Example 1, except that the hydroxyl (meth)acrylate 1 was changed to the hydroxyl (meth)acrylates 2 to 5. With the increase of the functional group number, the sensitivity tended to improve, and with the increase of the hydroxyl value, the adhesiveness tended to improve. The transfer rate of all the examples was 10% by mass or more, so that the transferability was good. In Examples 21 and 22 including the hydroxyl (meth)acrylate 2 (functional group number: 5 to 6) and the hydroxyl (meth)acrylate 3 (functional group number: 5 to 6), the sensitivity was very good.

The composition of the components used in Examples 21 to 24 and evaluation results are shown in Table 6.

TABLE 6

|  |  | Example | | | |
|---|---|---|---|---|---|
|  |  | 21 | 22 | 23 | 24 |
| Composition (% by mass) | Pigment | 17.8 | 17.8 | 17.8 | 17.8 |
|  | Resin 1 | 11.8 | 11.8 | 11.8 | 11.8 |
|  | Hydroxyl (meth)acrylate 2 | 53.3 | — | — | — |
|  | Hydroxyl (meth)acrylate 3 | — | 53.3 | — | — |
|  | Hydroxyl (meth)acrylate 4 | — | — | 53.3 | — |
|  | Hydroxyl (meth)acrylate 5 | — | — | — | 53.3 |
|  | Body pigment | 2.0 | 2.0 | 2.0 | 2.0 |
|  | Photopolymerization initiator 1 | 7.0 | 7.0 | 7.0 | 7.0 |
|  | Polymerization inhibitor | 0.1 | 0.1 | 0.1 | 0.1 |
|  | Pigment dispersant | 3.0 | 3.0 | 3.0 | 3.0 |
|  | Additive | 4.0 | 4.0 | 4.0 | 4.0 |
|  | Wax | 1.0 | 1.0 | 1.0 | 1.0 |
| Film substrate | Film type (No.) | 5-1 | 5-1 | 5-1 | 5-1 |
|  | Conditions of corona discharge treatment | 1 | 1 | 1 | 1 |

TABLE 6-continued

|  |  | Example | | | |
|---|---|---|---|---|---|
|  |  | 21 | 22 | 23 | 24 |
|  | Nitrogen element concentration (atom %) | 1.5 | 1.5 | 1.5 | 1.5 |
| Evaluation | Sensitivity [conveyor speed (m/minute)] | 135 | 130 | 125 | 110 |
|  | Transfer ratio (% by mass) | 11.3 | 11.5 | 11.4 | 11.6 |

TABLE 6-continued

|  | Example | | | |
|---|---|---|---|---|
|  | 21 | 22 | 23 | 24 |
| Peel strength (N/15 mm) | 3.3 | 3.4 | 4.4 | 4.6 |

Examples 25 to 29

The printing experiment was carried out, and sensitivity, transferability, adhesiveness to a film were evaluated in the same manner as in Example 1, except that the hydroxyl (meth)acrylate 1 used in Example 1 was partially replaced with the hydroxyl rosin (meth)acrylates 1 to 5.

With the increase of the functional group number, the sensitivity tended to improve. The transfer rate of all the examples was 12% by mass or more, so that the transferability was very good. The peel strength of all the examples was 5 N/15 mm or more, so that the adhesiveness to a film was very good. In Examples 25, 26, and 29 including the hydroxyl rosin (meth)acrylate 1 (functional group number: 2 to 3), the hydroxyl rosin (meth)acrylate 2 (the functional group number: 2 to 3), and the hydroxyl rosin (meth)acrylate 5 (functional group number: 2 to 4), the sensitivity was very good.

The composition of the components used in Examples 25 to 29 and evaluation results are shown in Table 7.

with the alicyclic hydroxyl (meth)acrylates 1, 2, or the aliphatic hydroxyl (meth)acrylates 1, 2.

The sensitivity of the ink thus produced was 120 m/minute in terms of the belt conveyor speed, and all the examples were rated very good. The transfer rate of all the examples was 12% by mass or more, so that the transferability was also very good. The peel strength of all the examples was 5 N/15 mm or more, so that the adhesiveness to a film was also very good.

Examples 34 to 35

The printing experiment was carried out, and sensitivity, transferability, adhesiveness to film were evaluated in the same manner as in Example 1, except that the photopolymerization initiator 1 used in Example 1 was changed to the photopolymerization initiators 1 and 2 and the mixing ratio of the sensitizer 1 shown in Table 8.

The sensitivity of the ink thus produced tended to decrease when the photopolymerization initiator 1 was not used, and tended to improve when the photopolymerization initiators 1, 2, and the sensitizer 1 were used in combination. Example 35 showed a belt conveyor speed of 140 m/minute, so that its sensitivity was very good. The transfer rate of these examples was 10% by mass or more, and rated good.

TABLE 7

|  |  | Example | | | | |
|---|---|---|---|---|---|---|
|  |  | 25 | 26 | 27 | 28 | 29 |
| Composition (% by mass) | Pigment | 17.8 | 17.8 | 17.8 | 17.8 | 17.8 |
|  | Resin 1 | 11.8 | 11.8 | 11.8 | 11.8 | 11.8 |
|  | Hydroxyl (meth)acrylate 1 | 42.8 | 42.8 | 42.8 | 42.8 | 42.8 |
|  | Hydroxyl rosin (meth)acrylate 1 | 10.5 | — | — | — | — |
|  | Hydroxyl rosin (meth)acrylate 2 | — | 10.5 | — | — | — |
|  | Hydroxyl rosin (meth)acrylate 3 | — | — | 10.5 | — | — |
|  | Hydroxyl rosin (meth)acrylate 4 | — | — | — | 10.5 | — |
|  | Hydroxyl rosin (meth)acrylate 5 | — | — | — | — | 10.5 |
|  | Body pigment | 2.0 | 2.0 | 2.0 | 2.0 | 2.0 |
|  | Photopolymerization initiator 1 | 7.0 | 7.0 | 7.0 | 7.0 | 7.0 |
|  | Polymerization inhibitor | 0.1 | 0.1 | 0.1 | 0.1 | 0.1 |
|  | Pigment dispersant | 3.0 | 3.0 | 3.0 | 3.0 | 3.0 |
|  | Additive | 4.0 | 4.0 | 4.0 | 4.0 | 4.0 |
|  | Wax | 1.0 | 1.0 | 1.0 | 1.0 | 1.0 |
| Film substrate | Film type (No.) | 5-1 | 5-1 | 5-1 | 5-1 | 5-1 |
|  | Conditions of corona discharge treatment | 1 | 1 | 1 | 1 | 1 |
|  | Nitrogen element concentration (atom %) | 1.5 | 1.5 | 1.5 | 1.5 | 1.5 |
| Evaluation | Sensitivity [conveyor speed (m/minute)] | 120 | 120 | 100 | 110 | 120 |
|  | Transfer ratio (% by mass) | 12.2 | 12.4 | 12.5 | 12.4 | 12.3 |
|  | Peel strength (N/15 mm) | 5.4 | 5.2 | 5.1 | 5.3 | 5.5 |

Examples 30 to 33

The printing experiment was carried out, and sensitivity, transferability, adhesiveness to a film were evaluated in the same manner as in Example 1, except that the hydroxyl (meth)acrylate 1 used in Example 1 was partially replaced The peel strength of these examples was 3 N/15 mm or more, so that adhesiveness to a film was also good.

The composition of the components used in Examples 30 to 35 and evaluation results are shown in Table 8.

TABLE 8

| | | Example | | | | | |
|---|---|---|---|---|---|---|---|
| | | 30 | 31 | 32 | 33 | 34 | 35 |
| Composition (% by mass) | Pigment | 17.8 | 17.8 | 17.8 | 17.8 | 17.8 | 17.8 |
| | Resin 1 | 11.8 | 11.8 | 11.8 | 11.8 | 11.8 | 11.8 |
| | Hydroxyl (meth)acrylate 1 | 42.8 | 42.8 | 42.8 | 42.8 | 53.3 | 53.3 |
| | Alicyclic (meth)acrylate 1 | 10.5 | — | — | — | — | — |
| | Alicyclic (meth)acrylate 2 | — | 10.5 | — | — | — | — |
| | Aliphatic (meth) acrylate 1 | — | — | 10.5 | — | — | — |
| | Aliphatic (meth) acrylate 2 | — | — | — | 10.5 | — | — |
| | Body pigment | 2.0 | 2.0 | 2.0 | 2.0 | 2.0 | 2.0 |
| | Photopolymerization initiator 1 | 7.0 | 7.0 | 7.0 | 7.0 | — | 5.0 |
| | Photopolymerization initiator 2 | — | — | — | — | 7.0 | 1.0 |
| | Sensitizer 1 | — | — | — | — | — | 1.0 |
| | Polymerization inhibitor | 0.1 | 0.1 | 0.1 | 0.1 | 0.1 | 0.1 |
| | Pigment dispersant | 3.0 | 3.0 | 3.0 | 3.0 | 3.0 | 3.0 |
| | Additive | 4.0 | 4.0 | 4.0 | 4.0 | 4.0 | 4.0 |
| | Wax | 1.0 | 1.0 | 1.0 | 1.0 | 1.0 | 1.0 |
| Film substrate | Film type (No.) | 5-1 | 5-1 | 5-1 | 5-1 | 5-1 | 5-1 |
| | Conditions of corona discharge treatment | 1 | 1 | 1 | 1 | 1 | 1 |
| | Nitrogen element concentration (atom %) | 1.5 | 1.5 | 1.5 | 1.5 | 1.5 | 1.5 |
| Evaluation | Sensitivity [conveyor speed (m/minute)] | 120 | 120 | 120 | 120 | 90 | 140 |
| | Transfer ratio (% by mass) | 12.3 | 12.7 | 12.6 | 12.2 | 11.5 | 11.4 |
| | Peel strength (N/15 mm) | 5.3 | 5.1 | 5.0 | 5.1 | 3.1 | 4.0 |

The invention claimed is:

1. A method for producing a printed matter by printing ink on a film, comprising using a film having a nitrogen element concentration of 0.5 to 10.0 atom % in the film surface and irradiating with an active energy ray after printing,
   wherein a surface layer of the film is a layer having a nitrogen compound including at least one of melamine compounds and urethane compounds,
   wherein the ink is an active energy ray-curable printing ink including a pigment (a), a resin having an ethylenic unsaturated group (b), and a (meth)acrylate (c),
   wherein the resin having an ethylenic unsaturated group (b) has a carboxyl group, and an acid value of the resin is 30 mgKOH/g or more and 250 mgKOH/g or less.

2. The method for producing a printed matter of claim 1, wherein the film is a polyester film or a polyamide film.

3. The method for producing a printed matter of claim 1, wherein the film is made by mixing an amine ester compound in a film, and has been treated by corona discharge in an air atmosphere.

4. The method for producing a printed matter according to claim 1, wherein the ink is active energy ray-curable printing ink including a pigment (a), a resin having an ethylenic unsaturated group (b), and a (meth)acrylate (c),
   wherein the resin having an ethylenic unsaturated group (b) has a carboxyl group.

5. The method for producing a printed matter according to claim 1, wherein the (meth)acrylate (c) of the ink has an alicyclic skeleton or an aliphatic skeleton with a carbon number of 6 to 18.

6. The method for producing a printed matter according to claim 1, wherein the (meth)acrylate (c) of the ink has both of a rosin skeleton and a hydroxyl group.

7. The method for producing a printed matter according to claim 1, wherein the ink further comprises a photopolymerization initiator (d), and
   wherein the photopolymerization initiator (d) includes an acylphosphine oxide compound.

8. The method for producing a printed matter according to claim 4,
   wherein the ink further comprises a photopolymerization initiator (d), and
   wherein the photopolymerization initiator (d) includes an acylphosphine oxide compound.

9. The method for producing a printed matter according to claim 1, comprising printing the ink on the film using an offset printing plate.

* * * * *